Dec. 31, 1963 R. A. KAENEL 3,116,425
BISTABLE STAGES HAVING NEGATIVE RESISTANCE DIODES AND INDUCTORS
Filed June 27, 1960 5 Sheets-Sheet 1

INVENTOR
R. A. KAENEL
BY
ATTORNEY

United States Patent Office 3,116,425
Patented Dec. 31, 1963

3,116,425
BISTABLE STAGES HAVING NEGATIVE
RESISTANCE DIODES AND INDUCTORS
Reginald A. Kaenel, Murray Hill, N.J., assignor to Bell
Telephone Laboratories, Incorporated, New York,
N.Y., a corporation of New York
Filed June 27, 1960, Ser. No. 39,117
13 Claims. (Cl. 307—88.5)

This invention relates to signal translating circuits, and more particularly to reversible counting configurations including gated bistable circuits employing negative resistance diodes.

Reversible counters, i.e., counting configurations which are capable of upcounting or downcounting, depending respectively on the polarity of input signals applied thereto, are known in the digital information processing art. Typically, such a configuration includes a plurality of distinct gate and bistable circuits and two input terminals, upcount or positive input signals being applied to one input terminal of the configuration and downcount or negative input signals being applied to the other input terminal thereof, whereby in response to each input signal, and under the control of the gate circuits, the states of the bistable circuits are selectively altered.

An object of the present invention is the improvement of signal translating circuits.

More specifically, an object of this invention is the provision of bistable circuits which are capable of performing a gating function.

Another object of the present invention is the combining of a plurality of such gated bistable circuits to form single input terminal reversible counting configurations which are characterized by high-speed, low power dissipation, high reliability, and simplicity of design.

These and other objects of the present invention are realized in a specific illustrative embodiment thereof which includes a plurality of gated bistable circuits, each bistable circuit including two negative resistance diodes of the voltage-controlled type connected in series-aiding. Each bistable circuit also includes a first or regenerative inductor connected in series with the diodes and two series-connected resistors connected in parallel with the series combination including the diodes and the first inductor. A second or steering inductor is connected between the midpoint of the diodes and the midpoint of the resistors, and both input and gating signals are applied across the series-aiding diodes.

The gating signals condition the bistable circuits to respond or not respond to input signals. Thus, for example, a gating signal of one polarity and an input signal of the opposite polarity will not trigger a bistable circuit to change its state. On the other hand, the simultaneous application across the series-aiding doides of a bistable circuit of gating and input signals of the same polarity causes the bistable circuit to change its state and, due to the action of the first inductor, causes a regenerated or amplified output pulse of a predetermined width to appear across the diodes. Also, output signals representative of the state or condition of the bistable circuit may be derived from across one of the diodes of the circuit or from across one of the series-connected resistors thereof.

In an illustrative reversible counter including a plurality of such bistable circuits, the voltage appearing across the series-aiding diodes of one gated bistable stage is applied across the diodes of the next stage, and the voltage representative of the state of the first bistable stage is also applied, after a suitable time delay, across the diodes of the next stage. Thus, if the first or less significant stage is in its "1" state and if a relatively high voltage representative thereof is being coupled to the second or more significant stage, the switching of the first stage, by means of a positive input pulse, to its "0" state causes a regenerated positive signal to appear across the diodes of the second stage. This regenerated positive signal, in combination with the persistent relatively high voltage from the first stage, causes the second stage to change its state, for example, from a "0" to a "1" representation. Hence, the two bistable stages respond to a positive or upcount signal by switching from the binary indication 10 to the indication 01.

Similarly, assuming again that the first and second stages initially represent the binary number 10, the application of a negative input signal to the single input terminal of the first stage causes that stage to switch from a "1" to a "0" indication, thereby providing a regenerated negative signal across the diodes of the second stage. This regenerated negative signal, in combination with the persistent relatively high voltage from the first stage, is insufficient to cause the second stage to change its state. Hence, the two binary stages respond to a negative or downcount input signal by switching from the binary indication 10 to the indication 00.

Thus, a counting configuration made in accordance with the principles of the present invention includes a plurality of gated bistable circuits, each including series-aiding negative resistance diodes, and is capable of upcounting or adding and downcounting or subtracting, depending respectively on the polarity of the signals applied to the single input terminal of the configuration.

It is a feature of the present invention that a reversible counting configuration include a plurality of intercoupled gated bistable circuits each comprising series-aiding negative resistance diodes.

It is another feature of this invention that a reversible counting configuration include a single input terminal and a plurality of interconnected gated bistable circuits each comprising a series network having two series-aiding negative resistance diodes and an inductor.

It is still another feature of the present invention that a bistable circuit comprising two series-aiding negative resistance diodes include an inductor in series therewith to provide a regenerated output signal across the diodes in response to the application to the circuit of a switching signal.

It is another feature of this invention that a bistable circuit comprising two series-aiding negative resistance diodes include an inductor in series therewith to provide a regenerated output signal across the diodes in response to the application to the circuit of a signal from a switching source and, further, that the switching source include both input and gating signal sources.

A complete understanding of the present invention and of the above and other features and advantages thereof may be gained from a consideration of the following detailed description of illustrative embodiments thereof presented hereinbelow in connection with the accompanying drawing, in which.

A great variety of electronic devices and circuits exhibit negative resistance characteristics and it has long been known that such negative resistance characteristics may have one of two forms. The N-type negative resistance, which is referred to as open-circuit stable (or short-circuit unstable, or current-controlled) is characterized by zero-resistance turning points. The S-type negative resistance, which is referred to as short-circuit stable (or open-circuit unstable, or voltage controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January–March 1958, pages 603–604, and "Tunnel Diodes as High-Frequency Devices," H. S. Sommers, Jr., Proceedings of the Institute of Radio Engineers, volume 47, July 1959, pages 1201–1206.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction: that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Figure 1A:
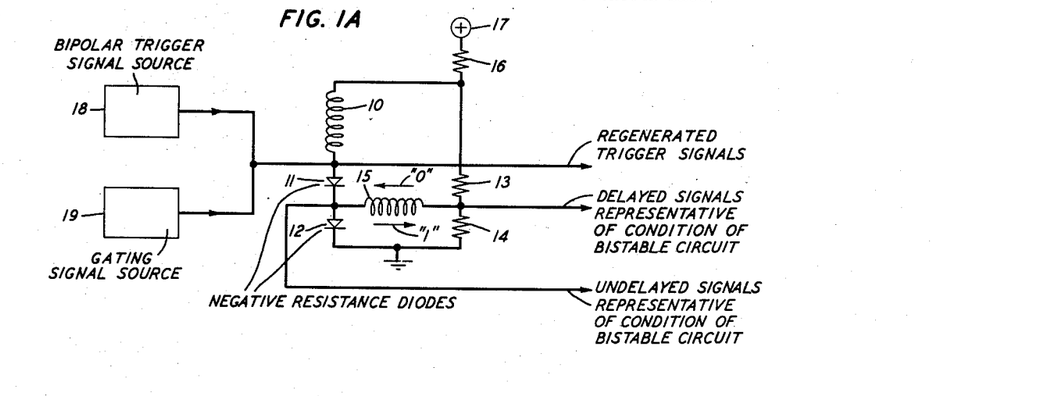
FIG. 1A is a schematic showing of a specific illustrative gated bistable circuit made in accordance with the principles of the present invention.

Referring now to FIG. 1A, there is shown a specific illustrative gated bistable circuit which embodies aspects of the principles of the present invention. The circuit includes a first series path including a regenerative inductor 10 and two series-aiding voltage-controlled negative resistance diodes 11 and 12, a second series path including resistors 13 and 14, and a steering inductor 15 connected between the midpoint of the diodes 11 and 12 and the midpoint of the resistors 13 and 14. Also included in the circuit of FIG. 1A are a resistor 16, a positive voltage source 17, a trigger signal source 18, and a gating signal source 19.

Further, the circuit of FIG. 1A is shown as including three output leads. On the uppermost one of these leads appears a regenerated trigger signal each time that the circuit changes its state or condition in response to properly applied trigger and gating signals. On the middle and lowermost output leads of FIG. 1A appear signals which are representative of the state of the bistable circuit. The voltages appearing on the lowermost output lead are indicated in FIG. 1A as being undelayed signals representative of the condition of the bistable circuit, while the voltages appearing on the middle output lead are indicated as being delayed signal representations of the condition of the bistable circuit. This characterization is intended to refer to the fact that a given voltage level persists on the middle output lead for a predetermined period of time after the diodes 11 and 12 are respectively switched from the condition which caused the given level to appear on the middle lead.

Figure 1B:
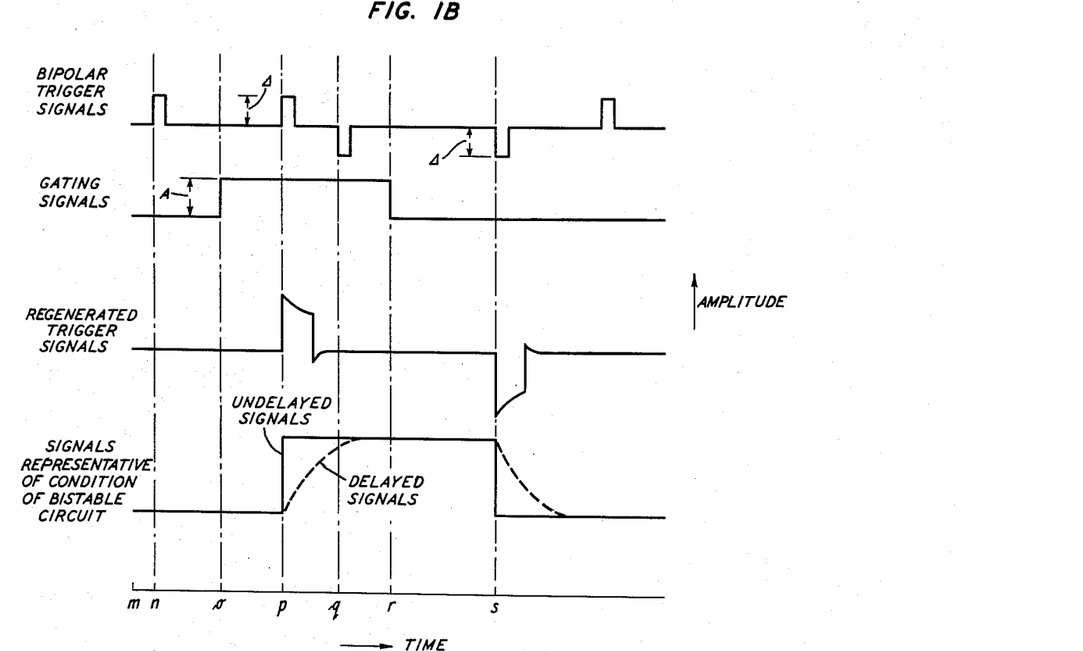
FIG. 1B graphically depicts the input and output wave forms of the circuit of FIG. 1A.
Figure 1C:
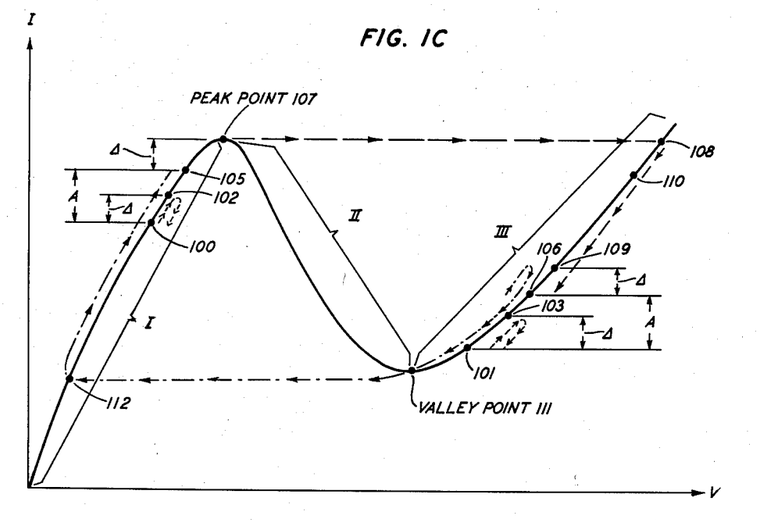
FIG. 1C illustrates the voltage-current characteristic curve of a negative resistance diode of the type included in the circuit of FIG. 1A, and, further, indicates the gated switching action that the diodes of FIG. 1A undergo in response to positive input signals.

The parameters of the circuit of FIG. 1A are so chosen that quiescently neither one of the negative resistance diodes 11 and 12 operates in the negative resistance region II of the voltage-current characteristic curve shown in FIG. 1C. Instead, one diode operates on one of the positive resistance regions I and III of the characteristic curve and the other diode operates on the other positive resistance region thereof. More specifically, one diode operates at a relatively high current-low voltage point represented, for example, by the point 100 of FIG. 1C, and the other diode operates at a relatively low current-high voltage point represented, for example, by the point 101 of FIG. 1C. The difference between the high and low current values flows through the inductor 15 and its direction of flow is indicative of the condition of the diodes 11 and 12. For example, for one stable condition of the bistable circuit of FIG. 1A, the diode 11 conducts a relatively high current and the diode 12 conducts a relatively low current. The difference between these currents flows from left to right through the inductor 15 and a relatively high current flows through the output resistor 14, thereby to provide thereacross a relatively high voltage. Herein, for illustrative purposes, a relatively high voltage level is considered representative of the binary value "1" and a relatively low voltage level is considered representative of the binary value "0". Accordingly, the lower arrow adjacent to the inductor 15 of FIG. 1A is labeled with the symbol "1". Conversely, the upper arrow, which indicates current flow from right to left through the inductor 15, is labeled with the symbol "0", thereby indicating that for the other stable or "0" condition of the bistable circuit of FIG. 1A the diode 11 conducts a relatively low current, the diode 12 conducts a relatively high current, and, as a result, a relatively low current flows through the output resistor 14, thereby to provide thereacross a relatively low voltage.

Because of the energy stored in the magnetic field around the inductor 15 of FIG. 1A, current conduction through the inductor 15 cannot change instantaneously. Therefore, by means of suitable signals from the sources 18 and 19, the currents flowing through the diodes 11 and 12 may be increased in a manner such that the difference therebetween remains substantially unchanged. This increase causes the current through one diode to increase to a value above that represented by the peak point of the voltage-current characteristic curve thereof. As a result, the one diode switches to its relatively high voltage positive resistance region to a point representative of a current which is greater than that flowing through the other diode. At the termination of the applied signals from the sources 18 and 19, the currents through the diodes start to decrease uniformly, in a two-diode regenerative gate type of operation, with the time constant of the decrease determined principally by the value of the regenerative gate inductor 10. Performing a highly accurate discrimination of the current through the inductor 15, the other diode reaches its current minimum or valley point and switches to the relatively low voltage positive resistance region of the characteristic curve before the one diode reaches its current minimum point. Then, the current through the other diode increases and the current through the one diode decreases, with the time constant of these actions determined principally by the value of the steering inductor 15. In this manner the other diode transfers to its high current-low voltage condition and the one diode transfers to its low current-high voltage condition. During this interchange action the current that controls which one of the two diodes will reside in the high or low voltage state, i.e., the current which flows through the inductor 15, decreases to zero and then builds up to a stable value in the reverse direction. As noted above, this reverse direction of current flow, which results in a relatively low current through and a relatively low voltage across the output resistor 14, is indicated in FIG. 1A by the arrow designated "0".

At a later instant of time, when other suitable switching signals are supplied from the sources 18 and 19 of FIG. 1A, the above-described redistribution of potentials occurs in the reverse direction, thus restoring the bistable circuit to the stable condition in which current flows from left to right through the inductor 15.

The inductor 10 of the bistable circuit of FIG. 1A is essential to the advantageous operation of this illustrative embodiment of the principles of the present invention. Because of the presence in the circuit of the inductor 10, the time required to switch the bistable circuit between its stable states is significantly reduced. Further, there appears across the series-aiding diodes 11 and 12, in response to each change-of-state of the bistable circuit, a regenerated trigger signal of a time duration determined principally by the inductor 10 and its associated series impedance. Accordingly, the shape of the trigger signal applied to the first one of a plurality of intercoupled bistable circuits is not as critical as it would otherwise be.

Figure 1D:
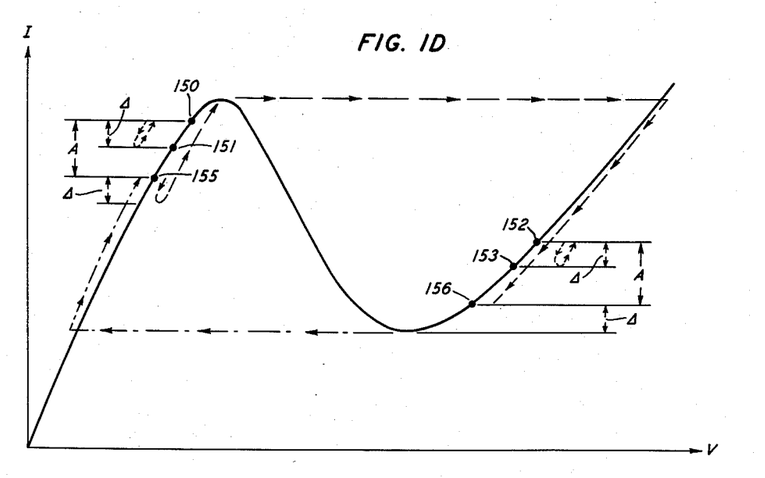
FIG. 1D illustrates the voltage-current characteristic curve of a negative resistance diode of the type included in the circuit of FIG. 1A, and, further, indicates the gated switching action that the diodes of FIG. 1A undergo in response to negative input signals.

The mode of operation of the gated bistable circuit of FIG. 1A may be clearly understood in detail by reference to FIGS. 1B, 1C, and 1D. FIG. 1B indicates that initially, i.e., at the time marked m on the time scale of FIG. 1B, a zero level trigger signal is supplied by the source 18 of FIG. 1A, a relatively low voltage gating signal is supplied by the source 19 of FIG. 1A, and the condition of the bistable circuit is represented by a relatively low voltage level. The operating points of the diodes 11 and 12 of FIG. 1A corresponding to the assumed initial conditions are indicated in FIG. 1C by the reference numerals 100 and 101, respectively.

Assume now that at the time marked n in FIG. 1B a positive trigger signal of amplitude Δ is supplied by the source 18 of FIG. 1A, the output of the gating signal source 19 remaining at a relatively low level. As seen in FIG. 1C, the positive trigger signal of amplitude Δ causes the operating point of the diode 11 of FIG. 1A to move from the point 100 to a point 102 and, then, as the trigger signal returns to a zero level, to move from the point 102 back to the initial operating point 100, this excursion of the diode 11 between the points 100 and 102 being indicated in FIG. 1C by a dotted line.

During the time that the operating point of the diode 11 of FIG. 1A shifts between the points 100 and 102 of FIG. 1C in response to a positive trigger signal and a relatively low voltage gating signal, the diode 12 moves from the operating point 101 to a point 103 and, then, as the trigger signal returns to a zero level, back to the initial point 101. Thus, it is seen that neither one of the diodes 11 and 12 switches in response to the above-assumed trigger and gating signals, that no regenerated trigger signal appears on the uppermost one of the output leads of FIG. 1A, and that the condition of the bistable circuit does not change.

Assume now that at the time marked o in FIG. 1B a relatively high level signal A is supplied by the gating source 19 of FIG. 1A. This gating or priming signal causes the operating point of the diode 11 to shift from the point 100 to a point 105 on the relatively low voltage positive resistance region I of the voltage-current characteristic curve of FIG. 1C and causes the operating point of the diode 12 to shift from the operating point 101 to a point 106 on the characteristic curve. Accordingly, when, at a subsequent time marked p in FIG. 1B, another positive trigger signal current of amplitude Δ is supplied from the source 18, the operating point of the diode 11 is raised from the point 105 over the peak point 107. A negligible part of this current flows through the inductors 10 and 15 of FIG. 1A because they possess the property of current inertia. Thus, substantially the entire positive signal current of amplitude Δ flows from top to bottom through the series-aiding diodes 11 and 12 of FIG. 1A, thereby, as indicated in FIG. 1C by dashed lines, causing the operating point of the diode 11 to switch from the quiescent point 105 to a point 108 on the relatively high voltage positive resistance region III of the characteristic curve and, during this same time, causing the operating point of the diode 12 to shift from the quiescent point 106 to a point 109. Then, as the positive signal current returns to a zero level, the operating point of the diode 11 moves from the point 108 to a point 110 which represents the same current value as the quiescent point 105, and the operating point of the diode 12 returns to the quiescent point 106.

At the termination of the positive signal current from the source 18 of FIG. 1A, and due to the collapse of the magnetic field about the regenerative inductor 10, the currents through the diodes 11 and 12 start to decrease uniformly from the operating points 110 and 106, respectively. The diode 12 reaches its current minimum or valley point 111 and switches to a point 112 on the relatively low voltage positive resistance region I of the characteristic curve of FIG. 1C before the diode 11 reaches it current minimum point. Thereafter, due to the collapse of the magnetic field about the steering inductor 15, the operating point of the diode 12 charges to the point 105, while the operating point of the diode 11 reaches the point 106. As noted above, during this interchange action the current flowing through the inductor 15 decreases to zero and then builds up to a stable value in the reverse direction.

The value of the steering inductor 15 may advantageously be chosen to be about twenty times that of the regenerative inductor 10. In response to a trigger signal, both inductors initially represent infinite impedances. Thereafter, however, during the time in which the currents through the diodes 11 and 12 are decreasing from the operating points 110 and 106, respectively, of FIG. 1C, the magnetic field about the regenerative inductor 10 is collapsing, whereas the steering inductor continues to represent essentially an infinite impedance, the circuit acting as a regenerative gate that has current discrimination properties. Then, during the time in which the operating point of the diode 12 is charging from the point 112 to the point 105 on the relatively low voltage positive resistance region of the characteristic curve of FIG. 1C, the magnetic field about the steering inductor 15 is collapsing, whereas, during this time, the change in current, and therefore also the change in magnetic energy storage, in the regenerative inductor 10 is essentially zero.

The above-described excursions of the diodes 11 and 12 provide on the uppermost output lead of the gated bistable circuit of FIG. 1A a regenerated trigger signal, i.e., an amplified trigger signal having a predetermined time duration which is determined by the constants of the circuit. Also, the above-described operation causes the states of the diodes 11 and 12 to be interchanged, which, in turn, means that the condition of the bistable circuit is changed. Note that the regenerated signal output and the change-of-state of the bistable circuit in response to the above-assumed trigger and gating signals are depicted in FIG. 1B.

At the time marked q in FIG. 1B, a negative trigger signal current of amplitude Δ and a relatively high level gating signal of amplitude A are supplied to the series-aiding diodes 11 and 12 of FIG. 1A by the sources 18 and 19. The diode 12 responds to this combination of signals by moving between the points 150 and 151 of FIG. 1D and the diode 11 responds thereto by shifting between the points 152 and 153, each of these excursions being indicated in FIG. 1D by a dotted line. Thus, a negative trigger signal and a relatively high or positive gating signal do not cause the state of the bistable circuit to change and do not cause a regenerated trigger signal to appear on the uppermost output lead of FIG. 1A.

Assume now that at the time marked r in FIG. 1B the gating signal supplied by the source 19 of FIG. 1A assumes a relatively low or negative value, the conditions of the diodes 11 and 12 being then indicated in FIG. 1D by the operating points 156 and 155, respectively, and that at a subsequent time marked s the source 13 supplies to the diodes 11 and 12 a negative trigger signal current of amplitude A, as depicted in FIGS. 1B and 1D. This negative trigger signal, in combination with the relatively low gating signal, causes the state of the bistable circuit to change and also causes a regenerated negative trigger signal to appear on the uppermost output lead of FIG. 1A. The switching actions which the diodes 11 and 12 undergo to cause these conditions are essentially similar in nature to those described above in connection with FIG. 1C for the case of a positive trigger signal and a relatively high or positive gating signal, and can be comprehended by particular reference to FIG. 1D, wherein the switching path of the diode 11 is indicated by dot-dash lines and that of the diode 12 by dashed lines.

To summarize so far: a positive trigger signal combined with a relatively high gating signal causes the bistable circuit of FIG. 1A to change its state and, further, due to the action of the inductor 10, causes a regenerated positive trigger signal of a fixed time duration to appear across the series-aiding diodes of the circuit. On the other hand, a positive trigger signal combined with a relatively low gating signal neither causes the bistable circuit to change its state nor causes a regenerated trigger signal to appear across the diodes thereof. Similarly, a negative trigger signal combined with a relatively low level gating signal causes the bistable circuit to change its state and causes a regenerated negative trigger signal to appear across the series-aiding diodes, while a negative trigger signal combined with a relatively high level gating signal neither causes the bistable circuit to change its state nor causes a regenerated signal to appear across the diodes.

It is significant to note, referring again to FIGS. 1A and 1B, that substantially undelayed signals representative of the condition of the bistable circuit are available across the lower one of the diodes 11 and 12, whereas relatively delayed bistable circuit condition signals are available across the output resistor 14. The amount of delay between signals obtained from these two points is shown in the lowermost wave form of FIG. 1B.

Figure 2A:
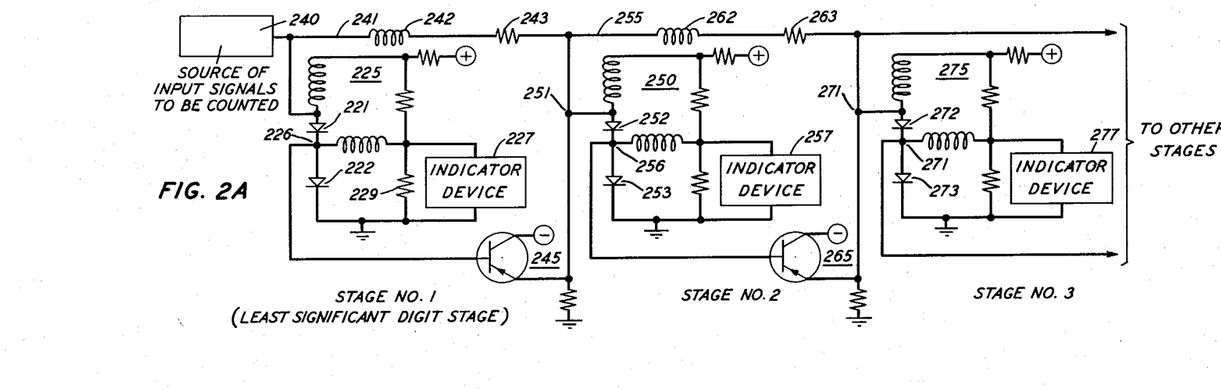
FIG. 2A is a schematic depiction of a specific illustrative reversible counter configuration made in accordance with the principles of the present invention.

Turning now to FIG. 2A, there is shown a specific illustrative reversible counting configuration including three bistable circuits 225, 250, and 275, each of the general type described above and shown in FIG. 1A. Each of the bistable circuits of FIG. 2A includes therein a device for indicating the state of the circuit. Thus, for example, the circuit 225 includes an indicator device 227 which is connected in parallel with the output resistor 229 and which is uniquely responsive to the relatively high and low voltage levels that appear across the resistor 229.

The bistable circuit 225 forms a part of the first or least significant digit stage of the reversible counting configuration of FIG. 2A. The parameters of the circuit 225 are so chosen that either a positive or a negative input signal from the source 240 causes the circuit 225 to change its state and a regenerated input signal to appear on the lead 241. This regenerated input signal is coupled via a network including a coupling inductor 242 and a resistor 243 to the single input terminal 251 of the second stage 250. Also coupled to the input terminal 251 are gating signals derived from the condition of the bistable circuit 225. It is essential to the proper operation of the counting configuration described herein that these circuit condition signals be delayed by a predetermined period of time and, further, since the midpoint 226 of the diodes 221 and 222 of the circuit 225 and the input terminal 251 are normally at different potentials, that a voltage level-shifting arrangement be included in the path intercoupling the points 226 and 251. Illustratively, an emitter-follower circuit 245 may be employed to provide both level-shifting and delay to signals coupled between the points 226 and 251.

As indicated above, input signals are coupled between adjacent ones of the bistable circuits of FIG. 2A by means of a path which includes a coupling inductor and a resistor. Thus, for example, the input signal path between the circuits 250 and 275 includes an inductor 262 and a resistor 263. The inductor 262 promotes efficient switching of the circuit 250 in response to suitable input and gating signals thereto by insuring that the major portions of these signals initially appear across the diodes 252 and 253. The resistor 263 is so proportioned with respect to the series impedance of the diodes 272 and 273 of the circuit 275 that only a regenerated input signal appearing on the lead 255 possesses an amplitude sufficient to cause the circuit 275 to change its state, when the circuit 275 is suitably gated by a signal coupled from the point 256 via the circuit 265 to the terminal 271.

Additionally, the attenuation provided by the coupling resistors 243 and 263 is such that a regenerated signal from the stage 225 is ineffective to switch the bistable circuit 275 even when the circuit 275 is gated by a signal whose polarity corresponds to that of the regenerated signal. In other words, a regenerated signal from a given stage is effective only to switch a suitably gated adjacent stage.

Figure 2B:
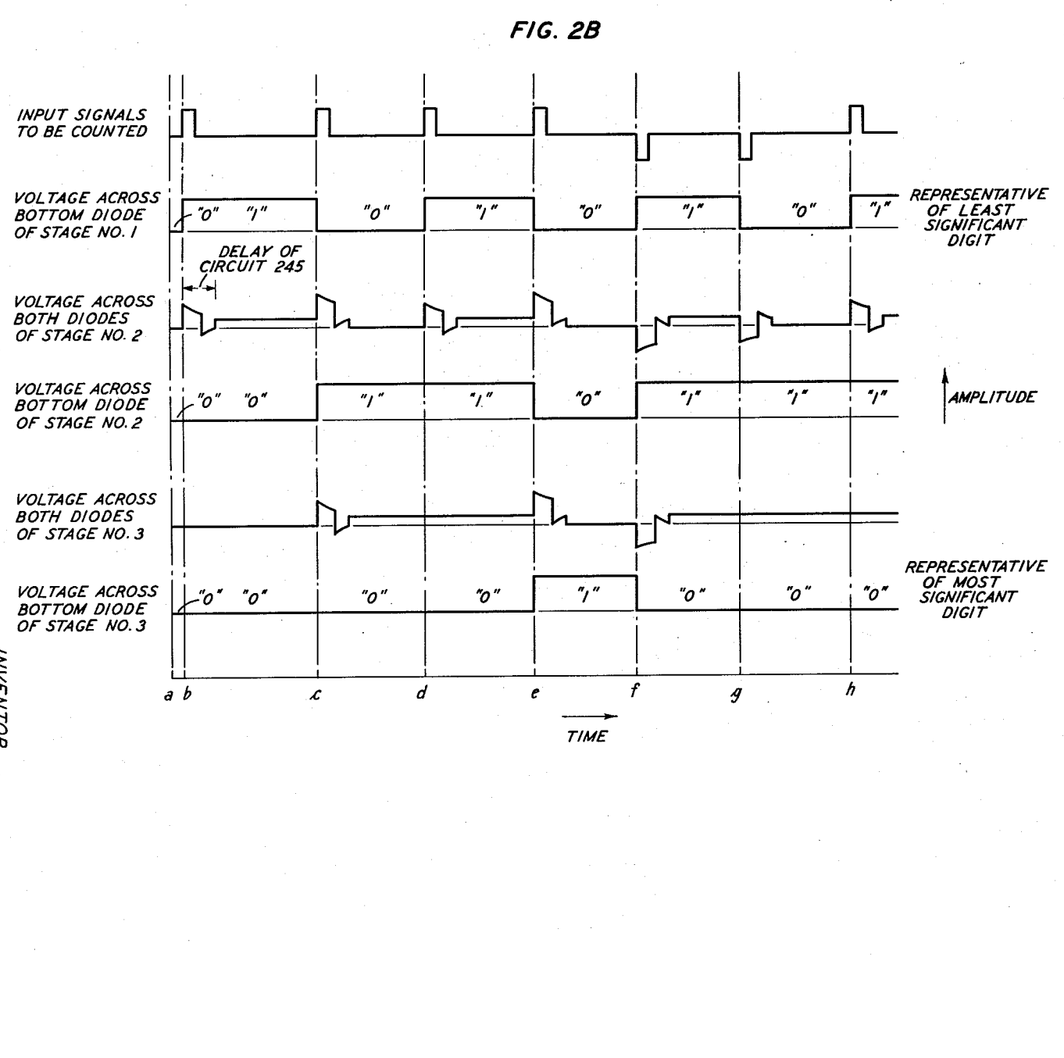
FIG. 2B graphically depicts various wave forms of the circuit shown in FIG. 2A.

The mode of operation of the counting configuration of FIG. 2A may be understood in detail by reference to FIG. 2B. Assume that initially, i.e., at the time marked a on the time scale of FIG. 2B, each of the bottom diodes 222, 253, and 273 is in its low voltage-high current stable state, thereby causing each of the devices 227, 257, and 277 to indicate a relatively low voltage representative of the binary value "0." At time b a positive upcount or add-one signal is supplied by the source 240. This signal causes the state of the circuit 225 to change; in particular, the input causes the bottom diode 222 to switch to its high voltage-low current stable state, thereby causing the indicator device 227 to represent a "1" signal. Also, a regenerated positive input signal appears across the diodes 221 and 222 and a portion of this regenerated signal appears at the input terminal 251 of the second bistable circuit 250. This portion of the regenerated signal appears at the terminal 251 before the gating signal appearing there undergoes a transition from a relatively low to a relatively high voltage level. This is due to the fact that the gating signal is coupled to the terminal 251 from the point 226 of the bistable circuit 225 via the delay circuit 245. In other words, although the bottom diode 222 switches from a relatively low to a relatively high level at approximately the time marked b, the relatively low level signal persists at the terminal 251 for a time which is dependent on the delay characteristics of the circuit 245 and which, advantageously, is chosen to be slightly longer than the duration of a regenerated signal. As a result, the circuit 250 does not change its state and a regenerated signal does not appear across the diodes 252 and 253. Hence, each of the devices 257 and 277 continues to represent the binary value "0." Thus, as indicated in FIG. 2B, the devices 227, 257, and 277 represent the binary word 100 in response to the application to the circuit of FIG. 2A of a single positive input signal.

If at the time marked c on the abscissa of FIG. 2B a second positive input signal is supplied by the source 240 of FIG. 2A, the following events occur. The voltage across the bottom diode 222 of the first stage switches to the relatively low level representative of the binary value "0" and a regenerated positive input signal appears across the diodes 221 and 222 and, also, in attenuated form, across the diodes 252 and 253 of the second stage. This regenerated signal, in combination with the persistent relatively high level gating signal from the delay circuit 245, causes the bottom diode 253 of the second stage to switch to the relatively high level representative of the binary value "1" and causes a regenerated positive signal to appear across the diodes 252 and 253 and, also, in attenuated form, across the diodes 272 and 273 of the third stage. However, the gating signal coupled to the input terminal 271 of the third stage from the delay circuit 265 persists as a relatively low level signal until the regenerated signal is no longer present at the terminal 271. Accordingly, the third stage does not change its state and both its bottom diode 273 and its indicator device 277 remain at the relatively low level representative of the binary value "0." Thus, as indicated in FIG. 2B, the devices 227, 257, and 277 represent the binary word 010 in response to the application to the circuit of FIG. 2A of two positive input signals.

In a manner similar to that described above, the circuit of FIG. 2A responds to the application thereto of a third positive input signal at the time marked $d$ in FIG. 2B by causing the devices 227, 257, and 277 to indicate the binary word 110 and to the application thereto of a fourth positive input signal at the time marked $e$ by causing the devices 227, 257, and 277 to indicate the binary word 001.

At the time marked $f$ in FIG. 2B, a negative downcount or subtract-one input signal is supplied by the source 240 of FIG. 2A. This signal causes the diode 222 of the first stage of the counting configuration to switch to its relatively high level state representative of the binary value "1" and causes a regenerated negative input signal to appear across the series-aiding diodes 252 and 253 of the second stage. This regenerated negative signal, in combination with the persistent low level gating signal applied to the second stage, causes the bottom diode 253 of the second stage to switch to its relatively high level state representative of the binary value "1." Further, the switching of the second stage causes a regenerated negative signal to be applied to the diodes 272 and 273 of the third stage, which regenerated signal, in combination with the persistent relatively low level gating signal coupled to the terminal 271 from the delay circuit 265, causes the bottom diode 273 of the third stage to switch to its relatively low voltage state representative of the binary value "0." Thus, as indicated in FIG. 2B, the devices 227, 257, and 277 indicate the binary word 110 in response to the application to the circuit of FIG. 2A of four positive upcount signals and one negative downcount signal. Similarly, the circuit shown in FIG. 2A responds to the application thereto of a second negative input signal, at the time marked $q$ in FIG. 2B, by changing its indication from the binary representation 110 to 010, and responds to the application thereto of a fifth positive input signal at the time marked $h$ by changing its indication from 010 to 110.

In a similar manner, the counting configuration of FIG. 2A, which, although it is illustratively depicted as including only three stages, may be formed to include any desired number of stages, may be made to upcount or downcount in a reliable and high speed manner in response to any combination of positive and negative input signals.

Figure 2C:
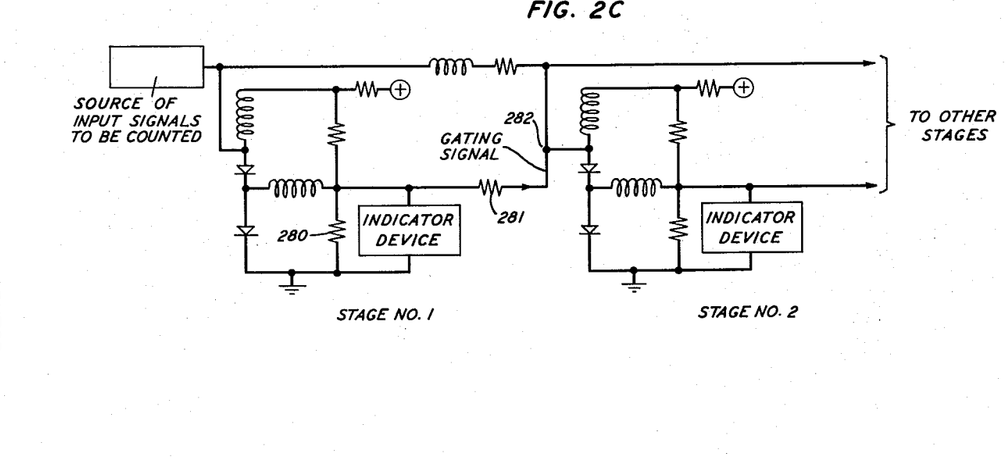
FIG. 2C schematically illustrates a specific modification of the counter configuration of FIG. 2A.

As noted above in connection with the description of the circuit of FIG. 1A, a gated bistable circuit made in accordance with the principles of the present invention provides across the bottom one of the series-aiding negative resistance diodes thereof substantially undelayed signals representative of the condition of the bistable circuit and, further, provides across the bottom or output resistor thereof delayed circuit condition signals. Accordingly, rather than deriving a gating signal from across a bottom diode and then selectively delaying the signal through a delay arrangement such, for example, as the emitter-follower circuit 245 of FIG. 2A, an already-delayed gating signal may be derived from across the output resistor and coupled to an adjacent bistable circuit by means of only a level-shifting series resistor. FIG. 2C shows a counting configuration embodying such an alternative arrangement. In FIG. 2C, a delayed gating signal is derived from across the output resistor 280 of the first stage and is coupled through a resistor 281 to the input terminal 282 of the second stage.

Figure 3:
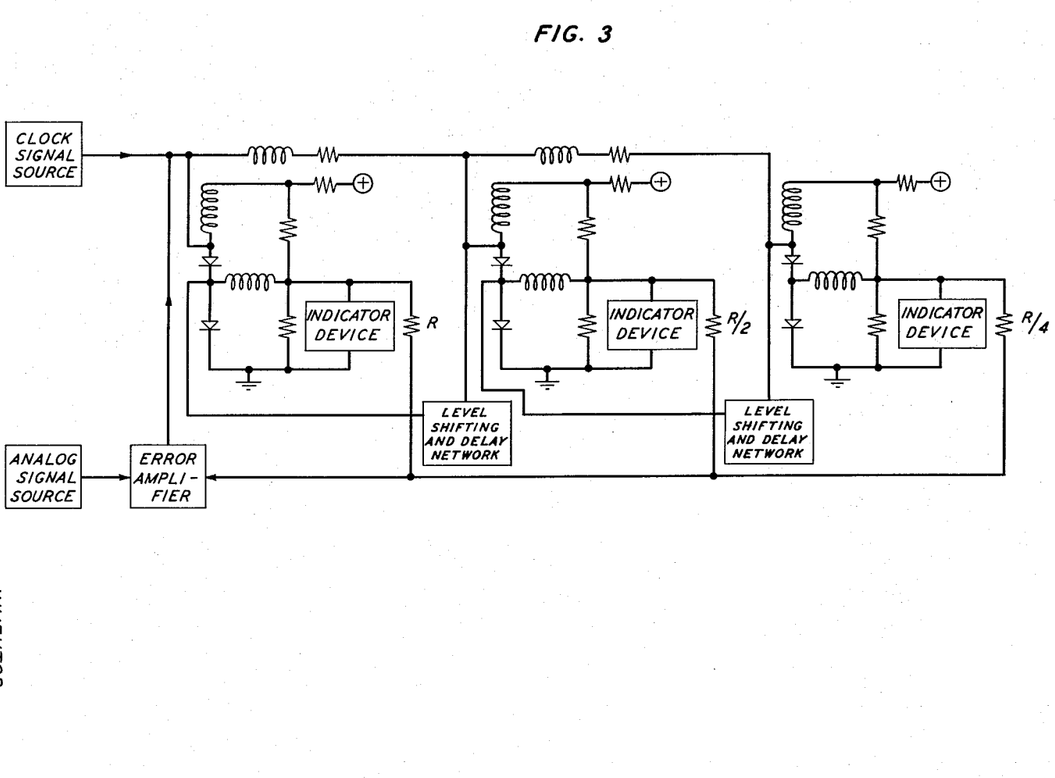
FIG. 3 is a schematic diagram of an analog-to-digital converter including a reversible counter configuration of the type shown in FIG. 2A.

One advantageous application of a counting configuration made in accordance with the principles of this invention is as a component of an analog-to-digital converter of the type including a counter whose digital representation is increased or decreased by applying clock signals thereto under the gating control of an error amplifier. Such a converter, which is shown in FIG. 3, is well known, from the standpoint of over-all organization, in the digital information processing art: see, for example, R. A. Heising Patent 2,539,623, issued January 30, 1951, for a description of this type of converter.

One illustrative set of values for the components of the circuit shown in FIG. 1A is as follows: negative resistance diodes 11 and 12 each—20 milliamperes peak current, germanium type tunnel diode; inductor 10—1 microhenry; inductor 15—20 microhenries; resistors 13 and 14 each—39 ohms; resistor 16—20 ohms; source 17—+2 volts. Additionally, the inductors 242 and 262 of FIG. 2A may advantageously each have a value of the order of 0.1 microhenry and the resistors 243 and 263 of FIG. 2A may each have the value 24 ohms.

It is emphasized that although particular attention herein has been directed to the use of tunnel diodes as the negative resistance diodes of the above-described circuits, other two-terminal voltage-controlled negative resistance arrangements having characteristics of the general type shown in FIGS. 1C and 1D may also be used therefor.

It is to be understood that the above-described arrangements are only illustrative of the application of the principles of the present invention. Numerous other arrangements may be devised by those skilled in the art without departing from the spirit and scope of this invention. For example, level-shifting and delay arrangements other than the emitter-follower circuits shown in FIG. 2A are suitable for inclusion in counting configurations embodying the principles of the present invention.

What is claimed is:

1. In combination in a gated bistable circuit, first circuit path means comprising two voltage-controlled negative resistance diodes connected in series-aiding, a first inductor connected in series with said diodes, second circuit path means connected in parallel with said first circuit path means and comprising two series-connected resistors, a second inductor connected between the midpoint of said series-aiding diodes and the midpoint of said series-connected resistors, source means for biasing one of said diodes to the relatively low voltage positive resistance region of its characteristic curve and for biasing the other one of said diodes to the relatively high voltage positive resistance region of its characteristic curve, gating source means for biasing each of said diodes to one of two selected operating points on its positive resistance region, and bipolar trigger signal source means connected to the junction of said first inductor and said series-aiding diodes for supplying a positive signal which, only when said diodes are biased at their relatively high voltage operating points, causes said diodes to interchange their positions on said positive resistance regions and a regenerated positive signal to appear across said diodes and for supplying a negative signal which, only when said diodes are biased at their relatively low voltage operating points, causes said diodes to interchange their positions on said positive resistance regions and a regenerated negative signal to appear across said diodes.

2. In combination, first circuit path means comprising two voltage-controlled negative resistance diodes connected in series-aiding and first inductance means connected in series with said diodes, second circuit path means connected in parallel with said first circuit path means and comprising two series-connected impedance elements, second inductance means connected between the midpoint of said series-aiding diodes and the midpoint of said series-connected impedance elements, source means for biasing one of said diodes to the relatively low voltage positive resistance region of its characteristic curve and for biasing the other one of said diodes to the relatively high voltage positive resistance region of its characteristic curve, and signal source means connected to the junction of said first inductance means and said series-aiding diodes for applying a signal to said diodes to cause them to interchange their positions on said positive resistance regions and thereby to cause a regenerated signal to appear across said diodes.

3. In combination, first circuit path means comprising two voltage-controlled negative resistance diodes connected in series-aiding and first inductance means connected in series with said diodes, second circuit path means connected in parallel with said first circuit path means and comprising two series-connected impedance elements, second inductance means connected between the midpoint of said series-aiding diodes and the midpoint of said series-connected impedance elements, source means for biasing one of said diodes to the relatively low voltage positive resistance region of its characteristic curve and for biasing the other one of said diodes to the relatively high voltage positive resistance region of its characteristic curve, and bi-polar trigger signal source means connected to the junction of said first inductance means and said series-aiding diodes for supplying a positive signal which causes a regenerated positive signal to appear across said diodes and for supplying a negative signal which causes a regenerated negative signal to appear across said diodes.

4. In combination in a reversible counting configuration, a plurality of bistable circuits arranged in a linear array, each of said circuits comprising two voltage-controlled negative resistance diodes connected in series-aiding, regenerative inductance means connected in series with said diodes, means for biasing one of said diodes to the relatively low voltage positive resistance region of its characteristic curve and for biasing the other one of said diodes to the relatively high voltage positive resistance region of its characteristic curve, input means for applying signals across the diodes of each of said bistable circuits, and gating signal means interconnecting adjacent ones of said bistable circuits.

5. A combination as in claim 4 wherein said input means includes network means interconnecting adjacent ones of said bistable circuits.

6. A combination as in claim 5 wherein said network means comprises a coupling inductor and a resistor connected in series therewith.

7. A combination as in claim 4 wherein said gating signal means includes means for providing a delayed and level-shifted signal representative of the condition of the less significant one of said adjacent bistable circuits.

8. A combination as in claim 7 wherein said gating signal means further includes circuit path means connected between the midpoint of the series-aiding diodes of the less significant one of said adjacent bistable circuits and between the regenerative inductance means and the series-aiding diodes of the other one of said adjacent circuits.

9. A combination as in claim 8 wherein said circuit path means includes an emitter-follower circuit.

10. A combination as in claim 4 wherein each of said bistable circuits further comprises two series-connected impedance elements connected in parallel with said negative resistance diodes, and steering inductance means connected between the midpoint of said diodes and the midpoint of said impedance elements.

11. A combination as in claim 10 further including means for selectively indicating the potential across one of the impedance elements of each of said bistable circuits.

12. A combination as in claim 10 wherein said gating signal means further includes circuit path means connected between the midpoint of the series-connected impedance elements of the less significant one of said adjacent bistable circuits and between the regenerative inductance means and the series-aiding diodes of the other one of said adjacent circuits.

13. A combination as in claim 12 wherein said circuit path means includes a series resistor.

References Cited in the file of this patent

UNITED STATES PATENTS

| 2,614,141 | Edson | Oct. 14, 1952 |
| 2,614,142 | Edson | Oct. 14, 1952 |
| 2,966,599 | Haas | Dec. 27, 1960 |
| 2,975,377 | Price | Mar. 14, 1961 |

OTHER REFERENCES

Electronics, Aug. 7, 1959, p. 61.
Electronics, Nov. 27, 1959, pp. 60–64.